US 6,653,121 B2

(12) United States Patent
May

(10) Patent No.: US 6,653,121 B2
(45) Date of Patent: Nov. 25, 2003

(54) ROUGHENED AND OXIDIZED WELL CHIPS AND METHOD OF MAKING SAME

(75) Inventor: Jeffrey L. May, Fremont, CA (US)

(73) Assignee: Tactical Fabs, Inc., Fremont, CA (US)

( * ) Notice: Subject to any disclaimer, the term of this patent is extended or adjusted under 35 U.S.C. 154(b) by 0 days.

(21) Appl. No.: 10/010,312

(22) Filed: Nov. 9, 2001

(65) Prior Publication Data

US 2002/0137078 A1 Sep. 26, 2002

Related U.S. Application Data

(60) Provisional application No. 60/247,324, filed on Nov. 10, 2000.

(51) Int. Cl.[7] .............................................. C12M 1/34
(52) U.S. Cl. ................. 435/287.2; 435/288.4; 435/305.2; 451/38; 451/39; 451/41; 451/75
(58) Field of Search .................... 435/287.2, 288.4, 435/305.2; 451/38, 39, 41, 75

(56) References Cited

U.S. PATENT DOCUMENTS

| 5,674,743 A | * | 10/1997 | Ulmer ...................... 435/287.2 |
| 6,235,471 B1 | * | 5/2001 | Knapp et al. ................... 435/6 |
| 2002/0110932 A1 | * | 8/2002 | Wagner et al. ............... 436/518 |

* cited by examiner

Primary Examiner—David A. Redding
(74) Attorney, Agent, or Firm—Gray Cary Ware & Freidenrich LLP

(57) ABSTRACT

A chip for holding DNA samples and method of making same by masking a silicon substrate for spaced apart wells with a photoabrasive masking material, blasting the masked surface with microabrasive beads to produce roughened wells in the substrate and forming an oxide coating over the masked and roughened surface of the substrate.

1 Claim, 2 Drawing Sheets

ROUGHENED AND OXIDIZED WELL CHIPS AND METHOD OF MAKING SAME

This application is based on and claims priority from provisional application Ser. No. 60/247,324 filed Nov. 10, 2000.

TECHNICAL FIELD

The present invention relates to the method of producing roughened and oxidized well chips and the well chips themselves. One use for the chip of this invention is in the field of functional genomics for DNA testing wherein the chip would hold or carry multiple, such as 24, 96 or 384, DNA samples.

BACKGROUND OF THE INVENTION

As the biotech industry continues to integrate applicable semiconductor processes into both existing and new product designs, the unique application for "chips" with wells to hold or carry DNA samples has required the development of a unique process to form chips with 125 $\mu$m and 400 $\mu$m deep wells, roughened and oxidized, typically with a uniform blue thickness.

Chemical etching of silicon (2.0 $\mu$m+technology) has been a standard practice in wafer processing for many years, but typical depths were only several microns deep with current technologies engaging plasma methods. The typical potassium hydroxide silicon wet etched process requires the deposit of a nitride protective film and then the removal of that nitride in the well area via a single wafer etch technique using SF6 gas followed by removal of the photo-resist in solvent such as NMP at 90° C. for 10 minutes and then rinsed and dried. Then the wafers are placed in a heated (70° C.) KOH bath. For 125 $\mu$m deep wells, five hours can be required and for 400 $\mu$m deep wells, sixteen hours can be required to etch the wells. Two heated KOH baths are required to compensate for depletion of the etchant. Then to remove the remaining nitride and roughen the well bottoms in parallel the wafers are placed in a Branson IPC using SF6 gas @ 100 watts for one hour.

The microabrasion process of the present invention produces the roughened wells easier, simpler, cheaper and more reliably.

A beadblasting process with the present invention not only offers an optimum roughing process but can form 400 $\mu$m deep wells by using a mask to protect the non-well area. This enables the wells to be formed and roughened, while being protected with a cost-effective disposable mask. In addition, since the majority of the wafer is not exposed to the microabrasion process, only the desired well area is roughened, enabling the growth of a uniform oxide color thereafter, advantageous in functional genomics.

DETAILED DESCRIPTION OF THE INVENTION

Figure 1:
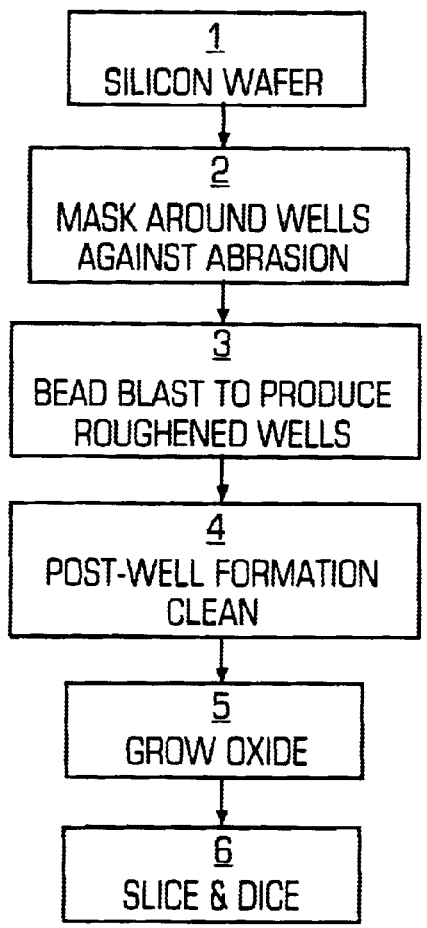
FIG. 1 is a flow chart showing the steps of the process of the present invention for making a well chip.

Referring now to FIG. 1, the preferred embodiment of the process of the present invention starts with an 8-inch silicon wafer, polished on one side with a thickness of 725±$\mu$m at step 1.

In step 2, the field portion of the chip that will surround the wells is masked with photobrasive masking material. Next, the masked wafer is processed through a beadblasting abrader such as a COMCO SA1203 mask abrader which utilizes fine particles such as of aluminum oxide or glass with sizes on the order of 10–20 $\mu$m. The predefined well depth is determined by the nozzle speed, nozzle diameter and blast pressure.

This microabrasion process produces the wells in five minutes rather than the sixteen to twenty hours required by an etch process. Additionally, the wells are produced with a roughened surface that is desirable for a chip which is then provided with an oxide layer for use for functional genomics.

A post-well formation cleaning step 4 then follows, preferably using a rinse in deionized water for five minutes, cleaning the wafers in NMP at 90° C. for ten minutes and then rinsing and drying.

With the wells formed in the chip, the desired oxide is grown in step 5 preferably by placement of the wafers in a diffusion furnace (THERMCO) to produce a thermal oxide of 3060 Å±60 Å at a temperature of 1000° C. and a gas ratio of $H_2O_2$ 1.8:1.

A legend, identifier or logo can be placed on the chip at this time and the chip sliced and diced ready for use in step 6.

Since the majority of the wafer is not exposed to the microabrasion process, only the desired well areas will be roughened, enabling the growth of a uniform oxide color.

Figure 2:
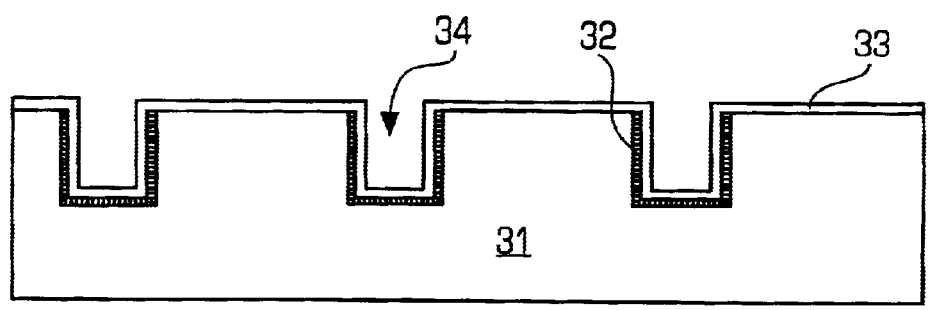
FIG. 2 is a cross-section of a well chip made in accordance with the present invention.
Figure 3:
FIG. 3 is an enlarged photograph of the microabrasion roughened silicon.

A cross-sectional view of a completed disk is shown in FIG. 2 with the silicon wafer 31 having roughened wall surfaces 32 in the wells 34 and the entire surface covered by the oxide layer 33.

I claim:

1. The method of forming a chip from a silicon substrate for holding DNA samples comprising the steps of:

masking the surface of the silicon substrate for spaced apart wells with a photobrasive masking material, blasting the masked surface with microabrasive beads to produce roughened wells in the surface of the substrate, and forming an oxide layer over the masked and roughened surface of the substrate.

* * * * *